UNITED STATES PATENT OFFICE.

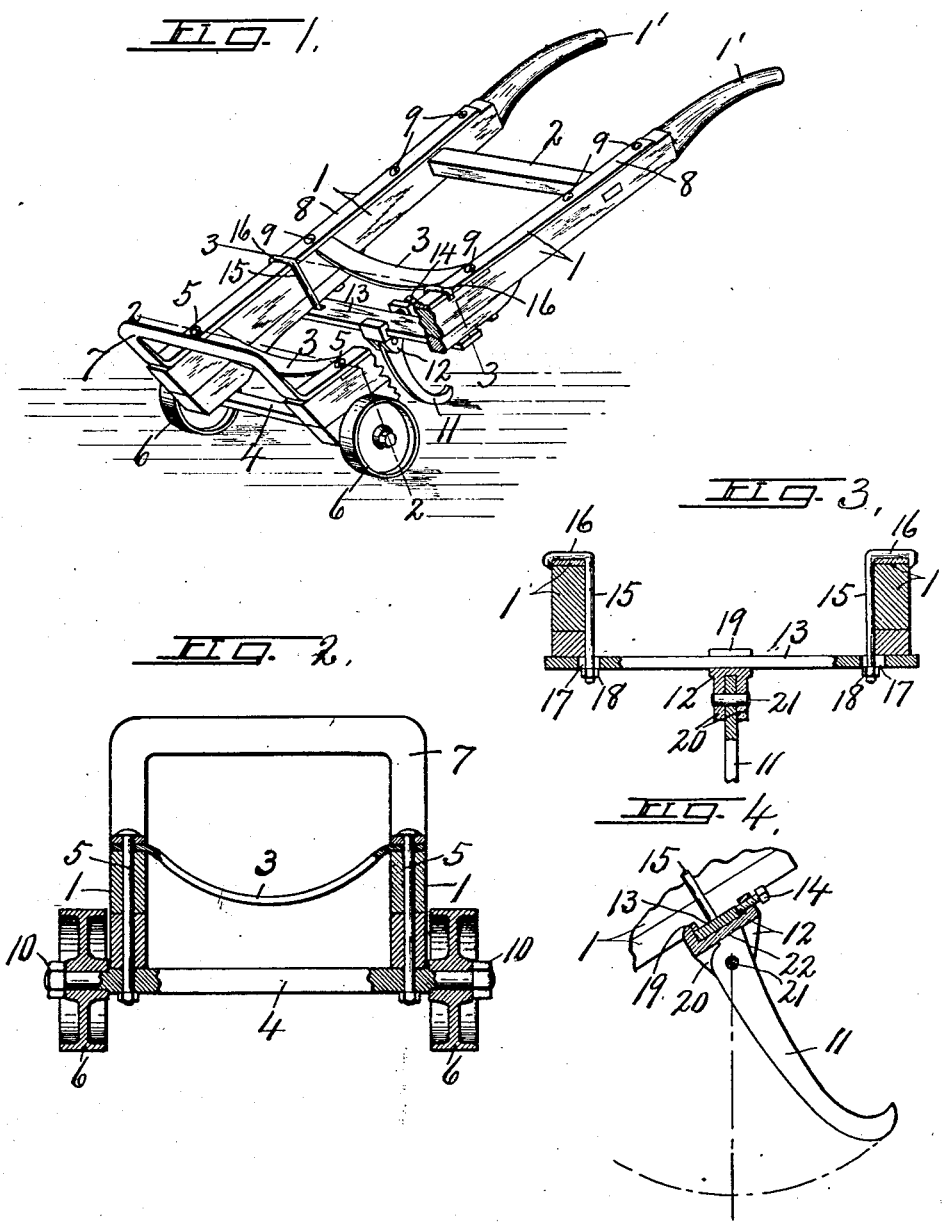

FRANK S. RICKER, OF ONEIDA CASTLE, NEW YORK, ASSIGNOR TO ONEIDA COMMUNITY, LIMITED, OF ONEIDA, NEW YORK, A CORPORATION OF NEW YORK.

HAND-TRUCK.

1,090,501.  Specification of Letters Patent.  Patented Mar. 17, 1914.

Application filed August 11, 1913. Serial No. 784,257.

*To all whom it may concern:*

Be it known that I, FRANK S. RICKER, of Oneida Castle, in the county of Oneida, in the State of New York, have invented new and useful Improvements in Hand-Trucks, of which the following, taken in connection with the accompanying drawings, is a full, clear, and exact description.

This invention relates to certain improvements in hand trucks of the class commonly employed for handling barrels, boxes and similar freight and refers more particularly to a safety appliance for reducing the liability of injury to the operator by the backward falling of the truck. These trucks are adapted for lifting, balancing and conveying heavy loads with the expenditure of a relatively small power and, for this purpose are constructed on the principle of a lever in which the wheels or axle constitute the fulcrum in close proximity to the front end or lifting bar or flange while the main body including the handle bars at the rear of the fulcrum constitute the longer arm of the lever and is sufficiently heavy to cause serious injury in case the truck either loaded or empty should accidentally fall back upon the legs or feet of the operator from any cause.

In loading the truck, the operator usually brings it to an approximately upright position until the lifting blade or bar registers with the underside of the object to be loaded and then places one foot under the truck and against the axle to force the said blade under such object, using one hand to firmly grip one handle of the truck while with the other hand the object is tilted rearwardly onto said truck, whereupon the latter with the load thereon is brought to a substantially balanced position and wheeled to the desired locality for deposit of the load in the usual and well known manner.

During these operations it sometimes happens that the handles will slip from the hands of the operator and allow the truck to fall back upon his legs or feet and the main object of my invention is to obviate these results and at the same time to afford simple means for temporarily supporting the truck with the load thereon in convenient position for conveying, in case the operator should wish to rest while transporting the load between distant points.

Another object is to make this support in the form of a forwardly and rearwardly swinging trailer-leg adapted to swing in a vertical plane toward and from the axle or fulcrum with suitable means for limiting its rearward movement to a position at substantially right angles to the plane of the truck so as to support said truck with the load thereon at different angles.

A further object is to enable the trailer-leg to be adjusted to different positions longitudinally and transversely of the truck as may be necessary in handling different loads or for the convenience of the operator in using either foot for engaging the axle and forcing the lifting flange under a box, barrel or other load.

Other objects and uses will be brought out in the following description.

In the drawings Figure 1 is a perspective view of a hand truck equipped with my improved safety appliance, a portion of one side of the truck being broken away to show more clearly the trailer. Figs. 2 and 3 are enlarged transverse sectional views taken respectively on lines 2—2 and 3—3, Fig. 1. Fig. 4 is a transverse sectional view of the cross bar and bracket showing the trailer leg in side elevation in its extreme rearward position.

As illustrated, this hand truck comprises a pair of oppositely disposed handle bars —1— spaced some distance apart and diverging rearwardly and held in fixed relation by suitable cross bars —2— and —3— and an axle —4—, the latter being secured to the underside of the front end of the truck by bolts —5— for receiving suitable wheels —6—.

A lifting flange or bar —7— is secured to the front ends of the upper edges of the handle bars —1— at an angle thereto and transversely thereof and has its opposite ends preferably provided with rearwardly extending straps —8— which are securely fastened to the upper edges of the handle bars by bolts —9—.

The rear ends of the handle bars —1— are provided with suitable handles —1'— located a considerable distance from the axle —4— or wheels —6— which constitute a fulcrum about which the truck frame may be rocked vertically, the flange —7— being located a relatively short distance in front of the axle and wheels so that the truck frame constitutes a lever having a relatively long arm provided with handles and a relatively short arm for receiving the load thus adapting the truck for lifting and balancing and conveying heavy freight. The cross bar —2— is preferably mortised into the handle bars —1— just in front of the handles and constitutes a brace for holding the handles a fixed distance apart. The cross bars —3— preferably consist of metal straps having their intermediate portions curved downwardly for receiving and supporting barrels and like objects and their ends secured in recesses in the upper edges of the bars —1— by the straps —8— and bolts —5— and —9—, thereby additionally holding these portions of the handle bars in fixed relation.

As previously stated, the axle —4— is secured by the bolts —5— to the underside of the front ends of the handle bars and its opposite ends are preferably cylindrical and extend beyond said handle bars for receiving the wheels —6— which are held in place by nuts —10— or equivalent fastening means on the ends of the axle.

The safety appliance, forming the subject matter of my present invention, preferably comprises a trailer leg —11— pivoted to a suitable bracket or hanger —12— which in turn is adjustably mounted upon a cross bar —13— and held in its adjusted position by a set screw —14—, the cross bar —13— being adjustable lengthwise of the truck frame and is secured in its adjusted position at its ends to the underside thereof by clamping bolts —15— as shown more clearly in Figs. 1, 3 and 4. These bolts —15—, as shown in Fig. 3, are provided with hook-shaped heads —16— slidably engaged with the upper faces or edges of the handle bars —1—, the lower ends of the bolts being extended downwardly at the inner sides of said handle bars and passed through lengthwise slots —17— in the opposite ends of the cross bar —13— so as to allow said cross bar to be shifted longitudinally of the truck frame, the ends of the cross bar —13— being held in their adjusted position against the underside of the handle bars by nuts —18— on the lower ends of the bolts —15—. This cross bar is preferably of uniform size from end to end to allow the bracket —12— to be adjusted longitudinally thereof or transversely of the truck frame for the purpose of shifting the trailer leg —11— to any desired position between the handle bars to suit the convenience of the operator in placing either foot against the axle and forcing the lifting bar —7— under the load in the usual manner.

The bracket —12— is provided in its upper side with a recess for receiving the bar —13—, one edge of the bracket being provided with an overhanging lip —19— forming a guide groove for the adjacent edge of the bar, while the opposite edge of the bracket is provided with an apertured lug for receiving the set screw —14—, the latter serving to engage the adjacent edge of the bar —13— for clamping the bracket in its adjusted position and, at the same time, permitting it to be adjusted when necessary. This bracket —12— is also provided with pendant lugs —20—spaced apart for receiving between them the upper end of the trailer leg —11— which is pivoted thereto by a bolt —21—, the lower face of the bracket between the legs being substantially flat to engage and coöperate with a similarly flattened surface —22— on the adjacent end or heel of the trailer leg —11—; said coacting flat faces constituting a stop for limiting the rearward movement of the trailer leg to a position at substantially right angles to the plane of the truck and at the same time permitting the trailer leg to swing forwardly toward and from the axle —4— for supporting the truck at different angles. This limiting stop or abutment —22— is disposed at the rear side of a line drawn at right angles to the truck frame through the axis of the pivot —21— and is located in close proximity to but just above said pivot so as to allow the free end of the trailer leg to swing through an arc of relatively long radius.

The weight of the trailer leg is sufficient to carry it downwardly and forwardly as the rear end of the truck frame is raised so that when it is free from engagement with the floor or ground it will assume a substantially vertical position ready to support the truck at any tilted angle. It is also clear that when the truck is raised to an upright position for receiving a load, the trailer arm will be carried forward by its own gravity closer to the axle or to the plane of the truck where it is out of the way of the foot of the operator in engaging the axle to force the lifting bar —7— under such load, but, as soon as the rear end of the truck is rocked downwardly with the load thereon, the trailer leg —11— will automatically rock rearwardly ready to engage the floor or ground and thereby limit the downward movement of the truck in case the operator should wish to temporarily rest and will also effectively prevent the descent of the truck upon the feet or legs of the operator in case the handle should accidentally slip from the hands.

The object in providing for the adjustment of the trailer leg and support lengthwise of the truck is to support the handle bars at the desired height according to the height of the operator. The object in providing the transverse adjustment of the trailer leg is to enable it to be brought to one side or the other of the longitudinal center of the truck to suit the convenience of the operator in placing one foot or the other under the truck and against the axle for forcing the lifting bar under the load.

The operation of my invention will now be readily understood upon reference to the foregoing description and the accompanying drawing and it will be evident that the detail of construction and arrangement of the various parts may be modified without departing from the spirit of this invention and, therefore, I do not limit myself to the precise construction as shown and described.

What I claim is:

1. A hand truck having a pair of handle bars, a cross bar adjustable lengthwise of the handle bars, means for clamping the cross bar in its adjusted position, a bracket on the cross bar, and a leg hinged to the bracket to swing lengthwise of the truck.

2. A hand truck having a pair of handle bars, a cross bar attached to the handle bars, a bracket adjustable lengthwise of and upon the cross bar, means for clamping the bracket in its adjusted position, and a leg pivoted to the bracket to swing lengthwise of the truck.

In witness whereof I have hereunto set my hand this 29th day of July, 1913.

FRANK S. RICKER.

Witnesses:
 FERRAND F. ELLIS,
 R. S. HURLBUT.